US008784199B1

(12) United States Patent
Henrick et al.

(10) Patent No.: US 8,784,199 B1
(45) Date of Patent: Jul. 22, 2014

(54) SYSTEM AND METHOD FOR ENCODING COMPRESSED MAP INFORMATION FOR A GAME MAP USING A QUADRANT BASED PNG IMAGE FILE (71) Applicants: Clive Henrick, Castro Valley, CA (US); Benjamin Taller, Berkeley, CA (US); Raymond Cook, Castro Valley, CA (US)

(72) Inventors: Clive Henrick, Castro Valley, CA (US); Benjamin Taller, Berkeley, CA (US); Raymond Cook, Castro Valley, CA (US)

(73) Assignee: Kabam, Inc., San Francisco, CA (US)

( * ) Notice: Subject to any disclaimer, the term of this patent is extended or adjusted under 35 U.S.C. 154(b) by 43 days.

(21) Appl. No.: 13/629,122

(22) Filed: Sep. 27, 2012

(51) Int. Cl.
G06F 17/00 (2006.01)
(52) U.S. Cl.
USPC .......................................................... 463/30
(58) Field of Classification Search
USPC ...................................... 463/30–34
See application file for complete search history.

(56) References Cited

U.S. PATENT DOCUMENTS

| 6,748,362 | B1 | 6/2004 | Meyer et al. | 704/500 |
| 7,348,977 | B2* | 3/2008 | West et al. | 345/426 |
| 7,356,158 | B2 | 4/2008 | Shi et al. | 382/100 |
| 7,787,652 | B2 | 8/2010 | Fridrich et al. | 382/100 |
| 2003/0081809 | A1 | 5/2003 | Fridrich et al. | 382/100 |
| 2008/0238941 | A1* | 10/2008 | Kinnan et al. | 345/630 |
| 2011/0249813 | A1 | 10/2011 | Lee et al. | 380/28 |
| 2013/0321422 | A1* | 12/2013 | Pahwa et al. | 345/428 |
| 2013/0321441 | A1* | 12/2013 | Pahwa et al. | 345/582 |

* cited by examiner

Primary Examiner — Ronald Laneau
(74) Attorney, Agent, or Firm — Pillsbury Winthrop Shaw Pittman LLP (57) ABSTRACT A quadrant based PNG image file may be used to encode compressed map information for a game map that is navigated during gameplay. The PNG image file encoded with compressed map information may be communicated to a gameplay device, which may decompress and decode the PNG image file to obtain the map information and generate the game map. Leveraging the lossless compression capabilities of the PNG image file format or other lossless image file format may reduce storage requirements and/or network bandwidth when playing the video game. Each pixel of the PNG image file may be used to encode multiple map tiles, allowing game maps to scale to large sizes while further leveraging the advantages of encoding the map information into the image file.

24 Claims, 7 Drawing Sheets

SYSTEM AND METHOD FOR ENCODING COMPRESSED MAP INFORMATION FOR A GAME MAP USING A QUADRANT BASED PNG IMAGE FILE

FIELD OF THE INVENTION

The disclosure generally relates to encoding, in an image file, map information used to define an array of map tiles forming a game map that is navigated during gameplay and in particular to using a quadrant based lossless image file to encode compressed map information for the game map.

BACKGROUND OF THE INVENTION

Games may use a game map that is navigated during gameplay. The game map may be generated using map information that includes tile information, which specifies map tiles that when tiled together form at least a portion of the game map. Each map tile may be specified by corresponding tile information. The tile information may describe various tile characteristics such as a type of terrain (e.g., mountain, forest, etc.), a tile level, a type of background, a game environment, a level characteristic, an enemy camp, an enemy type, an enemy characteristic, a reward, an item find, a special logic for tiles, and/or other information that may be related to a map tile. The game map and therefore the amount of map information can be large, making storage and transmission of the map information problematic for online and other game formats. For example, due to the large amount of map information, oftentimes only portions of the game map may be transmitted. As such, gameplay devices on which a game is played may be required to request additional map information as the game progresses or as users navigate the game map, reducing the quality of the gameplay experience.

As such, what is needed is to be able to communicate, store, and recall map information for a game map in an efficient manner. These and other problems exist.

SUMMARY OF THE INVENTION

One aspect of the disclosure relates to encoding map information for a game map that is navigated during gameplay into an image file and communicating the image file to convey the map information. The image file may include a lossless image file such that the map information may be compressed and retrieved. Due to the lossless compression qualities of the image file, large amounts of map information may be encoded, communicated and stored in an efficient and reproducible manner. Additionally, each pixel of the image file may be used to encode multiple map tiles, allowing game maps to scale to large sizes while further leveraging the advantages of encoding the map information into the image file.

A system may be configured to encode, communicate, save, and recall the map information in an image file. The system may include a game server, a gameplay device, and/or other components. The game server may include one or more processors configured to execute one or more modules such as a game module, a map tile module, a map information transformation module, a map information formatter module, an image encoder module, and/or other modules.

The game module may be configured to facilitate gameplay over a network such as the Internet in an interactive manner with the gameplay device. In other embodiments, the game module may facilitate gameplay by communicating a game application to the gameplay device, where the game may be executed locally at the gameplay device (although at least some interaction with the game server may occur). Whichever embodiment is used, a game map may specify locations that may be navigated during gameplay. For example, a user may navigate different locations of the game, where each location may be represented by a map tile that together with other map tiles form the game map.

The map tile module may be configured to define or store tile information that specifies the map tiles. The tile information may specify one or more tile characteristics such as a type of map tile (e.g., mountain, forest, etc.), a tile level related to the map tile, and/or other information related to a location on the game map that corresponds to the map tile. Map information may specify a plurality of the tile information such that the map information includes tile information for a plurality of tiles that form at least a portion of the game map.

The map information transformation module may be configured to obtain the map information, which specifies the tile information, and represent the tile information for individual ones of the map tiles as numerical values. In some embodiments, a single map tile may be represented as a numerical value. For example, a map tile associated with a forest and a tile level nine may be represented as a particular number. In other embodiments, different tile information for a single map tile may each be represented as a numerical value. For example, "forest" may be represented as a particular number while "level nine" may be represented as a different number.

The map information transformation module may represent the tile information as numerical values in a manner that is supported by the image file into which the numerical values will be encoded.

The map information formatter module may be configured to encode the numerical values that represent the tile information for the individual ones of the map tiles into an appropriate format used by the image file. The image format may accommodate a plurality of numerical values for individual pixels to specify levels for a plurality of base colors in a color space on a per pixel basis. The map information formatter module may encode the numerical values by recording the numerical values that represent the tile information for the individual ones of the map tiles as the plurality of numerical values for individual pixels such that the plurality of numerical values that would ordinarily correspond to base colors of an individual pixel correspond to the tile information. By doing so, the map information formatter module leverages the lossless compression properties of the image file (as well as methods of decompressing/decoding/reading contents of the image file) to convey the tile information.

The image encoder module may be configured to generate the image file using the encoded numerical values that represent the tile information and communicate the image file to convey at least a portion of the game map via the tile information encoded in the image file.

The gameplay device may receive the image file from the game server, decode the image file, obtain the map information based on the decoded image file, generate a game map based on the map information, and generate an interface for gameplay using the game map. The gameplay device may include one or more processors configured to execute one or more modules such as an image decoding module, a map information module, and/or other modules.

The image decoding module may be configured to decode the image file received from the game server. The decoded image file may be further processed in order to obtain the numerical values encoded therein.

The map information module may be configured to obtain the numerical values that represent tile information that specifies map tiles used to form at least a portion of the game map.

The obtained numerical values may be used to determine the tile information represented by the numerical values.

The game map generation module may be configured to generate at least a portion of the game map based on the determined tile information. For example, using the tile information for different map tiles, the game map generation module may generate the game map or portions thereof.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
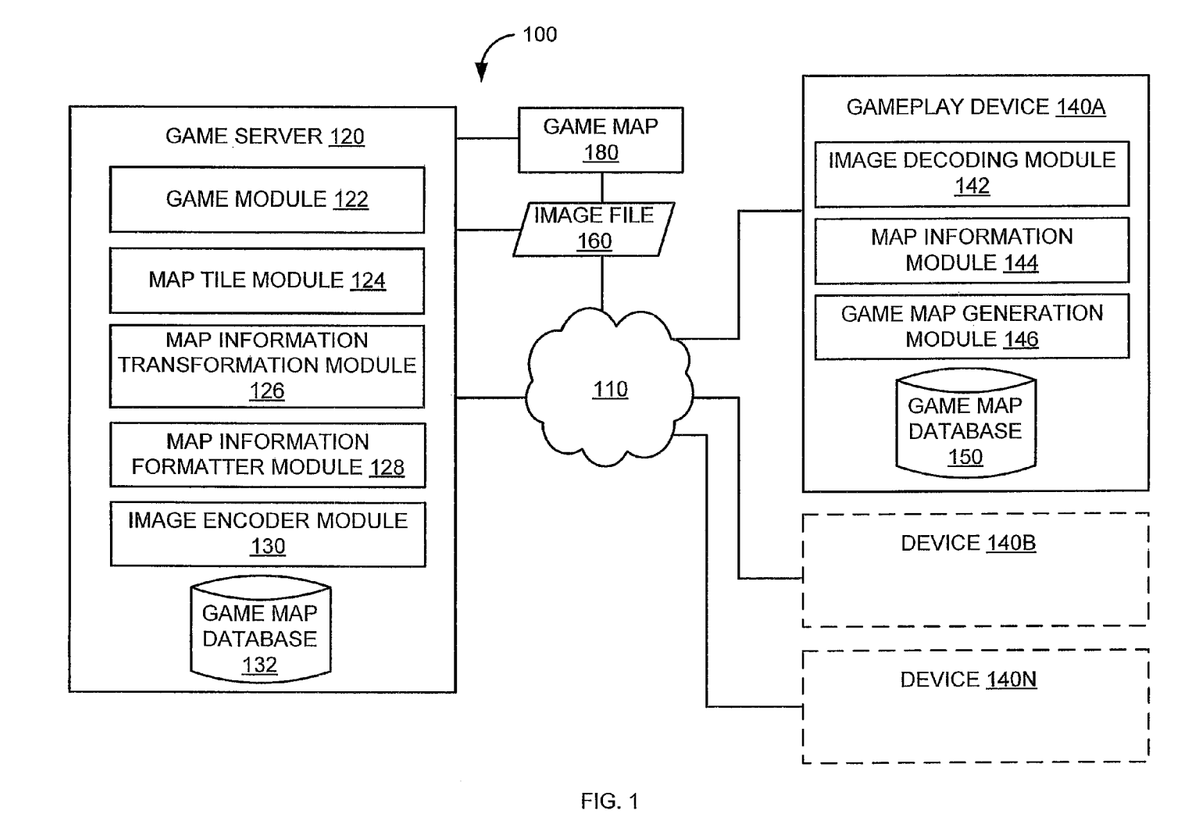
FIG. 1 illustrates a system of encoding, in an image file, map information used to define an array of map tiles forming a game map that is navigated during gameplay.

FIG. 1 illustrates a system 100 of encoding, in an image file 160, map information used to define an array of map tiles forming a game map 180 that is navigated during gameplay. System 100 may include a game server 120, a gameplay device 140 (illustrated in FIG. 1 as gameplay devices 140A, 140B, . . . , 140N), and/or other components.

Game server 120 may be configured to host an online game accessed by gameplay device 140 and/or provide a game (e.g., a game application) for execution at gameplay device 140. Game server 120 may encode, in image file 160, map information and communicate image file 160 to gameplay device 140. The map information encoded in image file 160 may be used at gameplay device 140 to generate game map 180 used for navigation during gameplay.

Image file 160 may be encoded into various lossless image file formats such that the map information may be compressed and retrieved while retaining the compressed information. Lossless image file formats may include, for example, Portable Network Graphics ("PNG"), Graphics Interchange Format ("GIF"), Tagged Image File Format ("TIFF"), and/or other image file formats that can compress information and recall the information after decompression without losing information. Due to the lossless compression qualities of the image file, large amounts of map information may be encoded, communicated, stored, and retrieved in an efficient in a reproducible manner.

Game server 120 may include one or more processors configured to execute one or more modules such as a game module 122, a map tile module 124, a map information transformation module 126, a map information formatter module 128, an image encoder module 130, and/or other modules.

Game module 122 may be configured to facilitate gameplay over a network such as the Internet in an interactive manner with gameplay device 140. For example, game module 122 may host an online game accessed by gameplay device 140. In other embodiments, game module 122 may facilitate gameplay by communicating a game application to gameplay device 140, where the game may be executed locally at the gameplay device. For example, game module 122 may communicate a mobile application that is downloaded to and executed at gameplay device 140. In this example, the game application may cause gameplay device 140 to interact with game server 120, although game server 120 does not host the game. Whichever embodiment is used, game map 180 may specify locations that may be navigated during gameplay.

Map tile module 124 may be configured to define or store tile information that specifies the map tiles. The tile information may specify a type of map tile (e.g., mountain, forest, etc.), a tile level related to the map tile, and/or other information related to a location on game map 180 that corresponds to the map tile. The map information may specify a plurality of the tile information such that the map information includes tile information for a plurality of map tiles that form at least a portion of game map 180.

Each map tile may include one or more tile characteristics that may be specified by its own tile information. The tile characteristics may include, for example, a type of terrain (e.g., mountain, forest, etc.) for the map tile, a tile level related to the map tile, a type of background for the map tile, a tile level, a game environment, a level characteristic, an enemy camp, an enemy type, an enemy characteristic, a reward, an item find, special logic for tiles, a position on game map 180 at which the map tile should be placed, and/or other information that may be related to a map tile.

In some embodiments, the tile information may include a position indicator that indicates a position on game map 180 at which the map tile should be placed. For example, the position indicator may include a unique map tile number, a grid space indicator, and/or other information that can be used to position a map tile on game map 180.

In some embodiments, game map 180 may be separated into distinct quadrants. In some embodiments, the position indicator may be absolute or relative with respect to the quadrants. An absolute position indicator may specify a position on game map 180 such that particular absolute positions on the game map are known to be related to a particular quadrant while other absolute position are known to be related to another quadrant. A relative position indicator may indicate a position within a particular quadrant. For relative position indicators, map information may include a quadrant indicator (which may be part of or included with the position indicator) that indicates the quadrant at which the map tile should be placed. The quadrant indicator and the position indicator may together be used to specify the position within a quadrant at which the map tile should be positioned when relative positions are used.

In some embodiments, instead of position or quadrant indicators, the position of a map tile may be implicit based on a position of a pixel of image file 160 used to encode one or more map tiles as described further with respect to image formatter module 130.

Game map 180 may be designed by a game developer. As such, the tile information may be specified by the game developer in order to build a mosaic of game map 180. Map tile module 124 may be used to retrieve the tile information specified by the game developer.

Game map 180 may include various formats such as, for example, a square grid map, a hexagonal (also referred to herein as "hex") grid map, and/or other formats that use map tiles that together form at least a portion of game map 180. Thus, each map tile may be or include a square map tile, a hex map tile, or other type of map tile. Based on the characteristics of the various map formats, the game developer may use square map tiles, hex map tiles or other types of map tiles according particular needs of the game to generate game map 180. Whichever type of map tile or format is used, game map 180 may be formed from a plurality of map tiles, each of which may be specified by the tile information and may relate to a particular location on the game map. In some embodiments, map tile module 124 may store the type of map tile to be used so that gameplay device 140 or other device may generate an appropriate type of map and/or may know how to interpret the tile information encoded in image file 160.

Map information transformation module 126 may be configured to obtain the map information, which specifies the tile information, and represent the tile information for individual ones of the map tiles as numerical values.

In some embodiments, a single map tile may be represented as a single numerical value. In these embodiments, all characteristics of a map tile may be represented as a single numerical value. For example, a map tile associated with a forest and a tile level nine may be represented as a particular number. In this example, the numerical value "127" may represent "forest, tile level nine." In other embodiments, different characteristics of a single map tile may be represented using different numerical values. For example, "forest" may be represented as a particular number while "level nine" may be represented as a different single number.

Embodiments where all characteristics of a map tile is represented as a single numerical value may encode more map tiles in image file 160 than embodiments where different tile characteristics are each encoded as different numerical values. However, embodiments that encode different tile characteristics as different numerical values may encode more characteristics for a given map tile than embodiments where all characteristics of a map tile are represented as a single numerical value.

In some embodiments, the numerical values may be constrained by predefined values based on the type of image file format of image file 160. As such, map information transformation module 126 may represent the tile information as numerical values in a manner that is supported by image file 160 into which the numerical values will be encoded.

Map information formatter module 128 may be configured to encode the numerical values that represent the tile information for the individual ones of the map tiles into an appropriate format used by image file 160. The image format may accommodate a plurality of numerical values for individual pixels to specify levels of a plurality of base colors in a color space on a per pixel basis. For example, the color and/or transparency for each pixel may be described by numerical values that are stored by image file 160. The numerical values accommodated by the image file that specify the color and/or transparency may be leveraged to accommodate the numerical values that represent the tile information.

In some embodiments, the numerical values for a single pixel may be used to accommodate numerical values for each of a plurality of map tiles. Generally speaking, in these embodiments, multiple map tiles may be encoded via a single pixel of image file 160. In other embodiments, the numerical values for a single pixel may be used to accommodate a single map tile. Generally speaking, in these embodiments, a single map tile may be encoded in a single pixel of image file 160.

Because different image formats may use different numerical values to specify levels of the plurality of base colors, the numerical values used by map information transformation module 126 and map information formatter module 128 may be constrained based on the type of image file used.

To illustrate, the PNG format will be described solely as a non-limiting example. Other image formats may be used as well based on the disclosure herein.

The PNG format may include values for each base color Red, Green, and Blue (also referred to as "RGB") in a color space, and an alpha channel. The functional specification for PNG, "Portable Network Graphics (PNG): Functional specification. ISO/IEC 15948:2003 (E)," is hereby incorporated by reference in its entirety.

As would be appreciated, the RGB base colors are additive and a different combination of RGB numerical values results in different colors in the color space. Each pixel of a PNG file may be specified by RGB values and the alpha channel. The individual base colors and the alpha channel may each be specified based on a range of numerical values ranging from 0 to 255. For example, RGB base ten numerical values "255, 0, 0" may specify full red, no green, and no blue, resulting in the color red. The numerical value of the alpha channel may specify a level of transparency of the base colors such that a pixel defined by the base colors may be opaque, transparent, or semi-transparent based on its alpha channel value.

Map information formatter module 128 may be configured to format the numerical values according to particular requirements of the image format of image file 160. For example, various image file formats may use a numerical value using a different radix than a numerical value that represents tile information. A game developer may specify that the base ten number "127" represents certain tile information but a particular image file may use a base sixteen (or hexadecimal) number to specify a base color. Map information formatter module 128 may convert the base ten number to the appropriate hexadecimal number as appropriate.

Map information formatter module 128 may encode the numerical values by recording the numerical values that represent the tile information for the individual ones of the map tiles as the plurality of numerical values for individual pixels such that the plurality of numerical values that would ordinarily correspond to an individual pixel correspond to the tile information. By doing so, map information formatter module 128 leverages the lossless compression properties of the image file (as well as methods of decompressing/decoding/reading contents of the image file) to convey the tile information.

Map information formatter module 128 may record the numerical values that represent tile information in a manner that maintains a pixel position-to-map tile position association, as illustrated in FIGS. 4-6.

In some embodiments, for example, map information formatter module 128 may associate a single pixel at a first position of image file 160 with multiple map tiles on game map 180. In these embodiments, numerical values that ordinarily specify base colors and/or transparency may be used to respectively specify tile information for a plurality of map tiles.

In the PNG example, for instance, image file 160 may accommodate R, G, B, and/or alpha numerical values to specify a base color and/or alpha transparency for a first pixel of the image file.

In some embodiments, the R, G, B, and/or alpha numerical values may each be used to accommodate the numerical values that represent tile information for different map tiles. For example, the "R" numerical value for the first pixel ordinarily specifying a base color value of "red" may be used to encode a numerical value that represents a first map tile to be positioned at a first position of game map 180. The "G" numerical value for the first pixel ordinarily specifying a base color value of "green" may be used to encode a numerical value that represents a second map tile to be positioned at a second position of game map 180. The "B" numerical value for the first pixel ordinarily specifying a base color value of "blue" may be used to encode a numerical value that represents a third map tile to be positioned at a third position of game map 180. The alpha numerical value for the first pixel ordinarily specifying a transparency value may be used to encode a numerical value that represents a fourth map tile to be positioned at a fourth position of game map 180. Subsequent pixels may be used to similarly specify other map tiles, starting at a fifth position of game map 180. For example, a pixel at the second position of image file 180 may be used to specify map tiles at a fifth, a sixth, a seventh, and an eighth position of game map 180.

In some embodiments, any combination of less than the four RGB and alpha values may be used to accommodate numerical values that represent different map tiles. For example, only the R+G, G+B, B+alpha, and/or other numbers and combinations of values may be used to accommodate numerical values that represent tile information.

In some embodiments, map information formatter module 128 may associate a pixel at a first position of image file 160 with a single position on game map 180. In these embodiments, different tile characteristics for a single map tile to be positioned at a single position on game map 180 may be encoded in corresponding numerical values that ordinarily describe the base colors of the pixel at the first position of image file 160.

In the PNG example, for instance, image file 160 may accommodate R, G, B, and/or alpha numerical values to specify a base color and/or alpha transparency for a first pixel of the image file.

In some embodiments, the R, G, B, and/or alpha numerical values may each be used to accommodate the numerical values that represent the tile information for a single map tile. For example, the "R" numerical value for the first pixel ordinarily specifying a base color value of "red" may be used to encode a numerical value that represents a first map tile characteristic of the single map tile to be positioned at a first position of game map 180. The "G" numerical value for the first pixel ordinarily specifying a base color value of "green" may be used to encode a numerical value that represents a second map tile characteristic of the single map tile to be positioned at the first position of game map 180. The "B" numerical value for the first pixel ordinarily specifying a base color value of "blue" may be used to encode a numerical value that represents a third map tile characteristic of the single map tile to be positioned at the first position of game map 180. The alpha numerical value for the first pixel ordinarily specifying a transparency of the colors of the first pixel may be used to encode a numerical value that represents a fourth map tile characteristic of the single map tile to be positioned at the first position of game map 180.

In some embodiments, any combination of less than the four RGB and alpha values may be used to accommodate numerical values that represent different map tile characteristics for the single map tile. For example, only the R+G, G+B, B+alpha, and/or other numbers and combinations of values may be used to accommodate numerical values that represent different map tile characteristics for the single map tile.

In some embodiments, the pixel position-to-map tile position association, associations between different numerical values of image file 160 to different map tile characteristics, the numerical values that represent the tile information, image file format used to encode the map information, and/or other information that may be used to describe the transformations of map information formatter module 128 may be stored in a memory such as game map database 132. In some embodiments, game map database 132 may be configured to store information for a plurality of games. In these embodiments, the foregoing and other information may be stored in association the different games identifiers. For example, each game may be associated with its own pixel position-to-map tile position association.

Image encoder module 130 may be configured to generate image file 160 using the encoded numerical values that represent the tile information and communicate the image file to convey at least a portion of the game map via the tile information encoded in the image file. Image encoder module 130 may communicate image file 160 via network 110 and/or other communication channel that is able to communicate the image file to gameplay device 140.

In some embodiments, image file 160 is communicated to gameplay device 140 at various times such as during a game registration, while initializing an online gaming session, during an online gaming session, beforehand such that the image file and/or decoded content thereof is stored at gameplay device 140 in advance of an online gaming session, while providing an application such as a mobile application to the gameplay device, and/or at other times.

In some embodiments, a single image file 160 is communicated to convey the entire game map 180. In other embodiments, multiple image files 160 may be communicated to convey different portions of game map 160. In these embodiments, the multiple image files 160 may be communicated at the same time or at different times (such as when a new part of the game map has been navigated to during gameplay).

Whichever method of communicating image file 160 is used, gameplay device 140 may obtain from image file 160 the map information encoded therein and generate game map 180 based on the map information.

Gameplay device 140 may include one or more processors configured to execute one or more modules such as an image decoding module 142, a map information module 144, a game map generation module 146, and/or other modules. Gameplay device 140 may receive image file 160 from game server 120 and/or an intermediate device, decode the image file, obtain the map information based on the decoded image file, generate game map 180 based on the map information, and generate an interface for gameplay using the game map.

Image decoding module 142 may be configured to decode the image file received from game server 120. The decoded image file may be further processed in order to obtain the numerical values encoded therein using various file specifications related to the image file format used by the image file. In some embodiments, image decoding module 142 may be configured to always decode image file 160 based on a preset image file format such as PNG. In other embodiments, image decoding module 142 may automatically detect the type of image file format based on, for example, a file extension or other information. In some embodiments, a memory of gameplay device 140 may store game map database 150, which may include at least some or all of the information stored in game map database 132. For example, game server 120 may communicate (e.g., during game registration, during an initialization of an online gaming session, etc.) at least a portion of game map database 132 to gameplay device 140, which may store the received content in game map database 150. As such, in some embodiments, image decoding module 142 may access game map database 150 to determine which type of image file format was used for a particular game.

Map information module 144 may be configured to obtain the numerical values that represent tile information that specifies map tiles used to form at least a portion of the game map. The obtained numerical values may be used to determine the tile information represented by the numerical values. In some embodiments, map information module 144 may transform the decoded numerical values from image file 160 into tile information represented by the numerical values. In some embodiments, map information module 144 may transform the decoded numerical values based on information stored by map tile database 150.

Game map generation module 146 may be configured to generate at least a portion of game map 180 based on the determined tile information. For example, using the tile information for different map tiles, game map generation module 146 may generate the game map or portions thereof. Gameplay device 140 may generate an interface for the game using the game map.

Network 110 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Those having skill in the art will recognize that game server 120 and gaming device 140 may each comprise one or more processors, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

Figure 2:
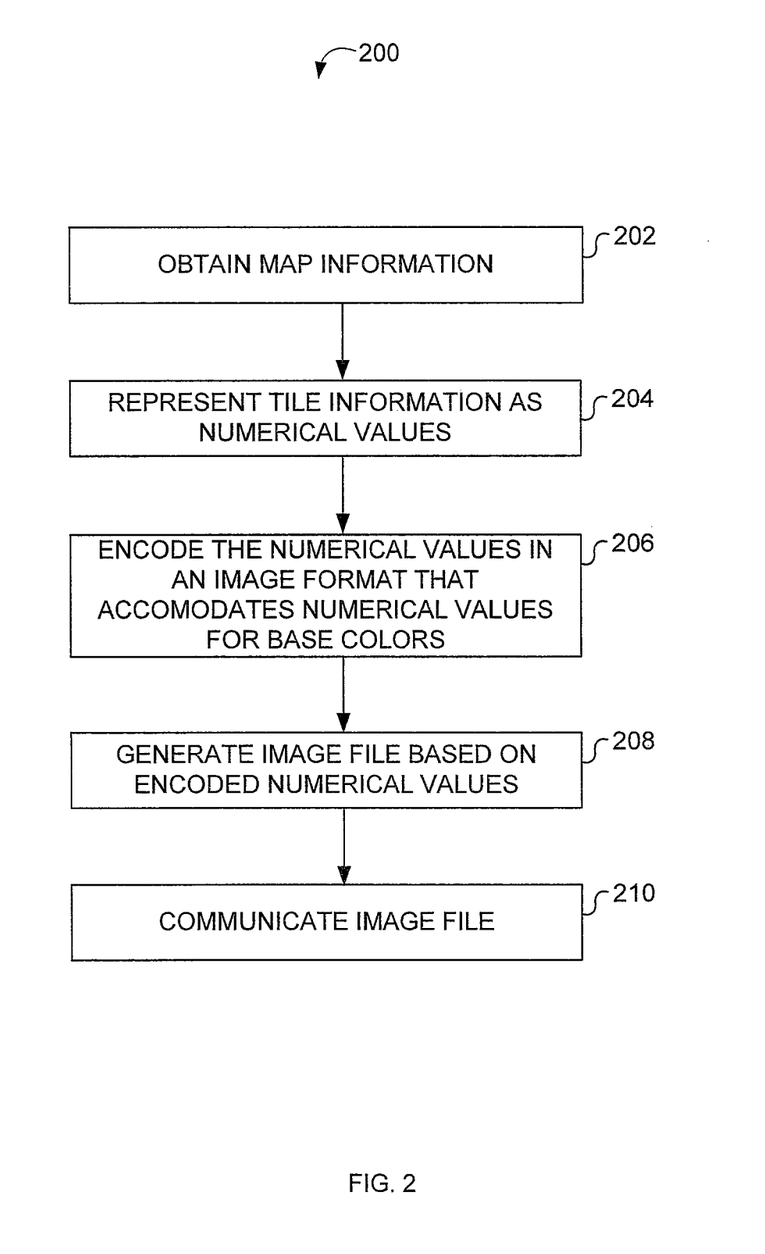
FIG. 2 illustrates a process for encoding, in an image file, map information used to define an array of map tiles forming a game map that is navigated during gameplay.

FIG. 2 illustrates a process 200 for encoding, in an image file, map information used to define an array of map tiles forming a game map that is navigated during gameplay. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, map information may be obtained. The map information may include tile information, which may specify an individual map tile. The map tile along with other map tiles may be used to form at least a portion of a game map that is navigated during gameplay. The map information may include tile information for each of different map tiles. Thus, the map information may be used to form at least a portion of the game map. In some embodiments, the tile information may describe one or more characteristics of a map tile such as, for example, a type of map tile, a tile level, a map tile position on the game map, and/or other information that describes a map tile.

In an operation 204, the tile information may be represented as numerical values. In some embodiments, a numerical value may represent one or more characteristics of the map tile. For example, a lookup table may be stored that allows the one or more characteristics to be assigned to the numerical value. In some embodiments, the numerical value may be used to represent a single map tile having one or more map tile characteristics.

In an operation 206, the numerical values that represent the tile information may be formatted using an image file format. Some image file formats may accommodate a plurality of numerical values to specify base colors in a color space for a single pixel, such that each pixel may accommodate a plurality of numerical values that ordinarily specify base colors and/or a transparency value for the pixel. For these image file formats, the numerical values may be used to record numerical values corresponding to multiple map tiles. Alternatively or additionally, the numerical values may be used to record numerical values corresponding to different characteristics of a single map tile.

In an operation 208, an image file in the image file format may be generated. An image file format specification such as the PNG specification incorporated by reference herein and/or other image file format specification that specifies a lossless image file may be used to generate the image file.

In an operation 210, the image file may be communicated. For example, the image file may be communicated to convey (via the encoded map/tile information) at least a portion of the game map to a gameplay device on which a user may play the game.

Figure 3:
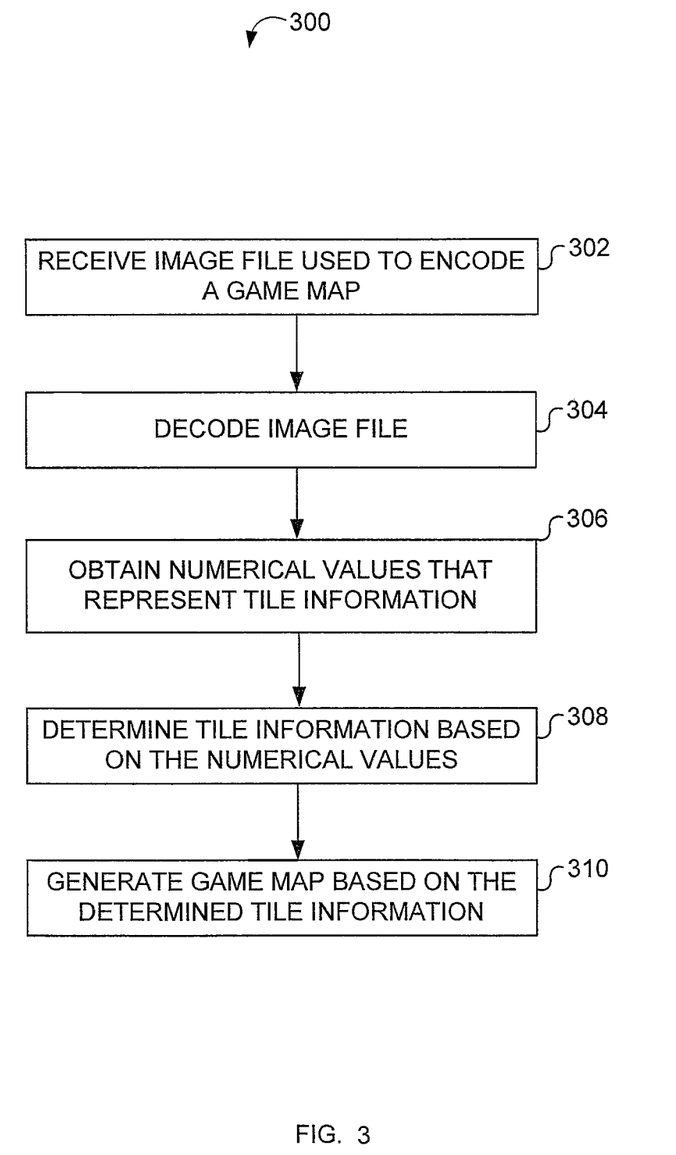
FIG. 3 illustrates a process for decoding, from an image file, map information used to define an array of map tiles forming a game map that is navigated during gameplay.
Figure 4A:
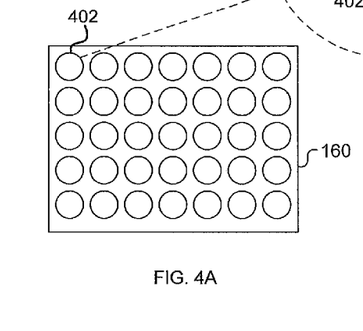
FIGS. 4A, 4B, 4C, and 4D illustrate examples of pixels of an image file.
Figure 4B:
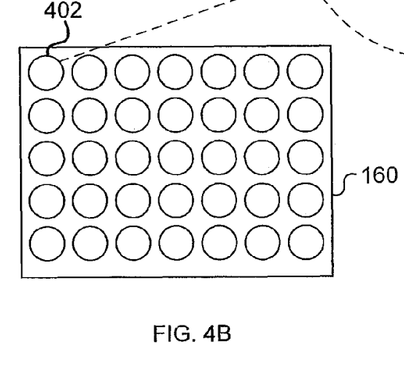
Figures 4C, 5C:
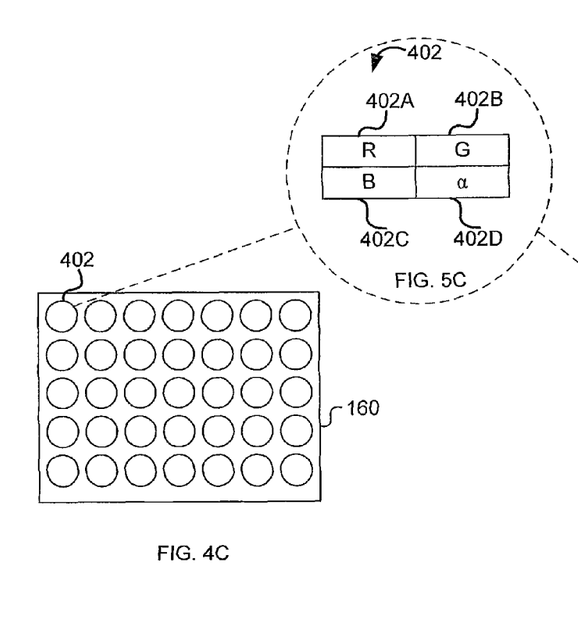
FIGS. 5A, 5B, 5C, and 5D illustrate examples of numerical values accommodated by a particular pixel of the image files respectively illustrated in FIGS. 4A, 4B, 4C, and 4D.
Figures 4D, 5D:
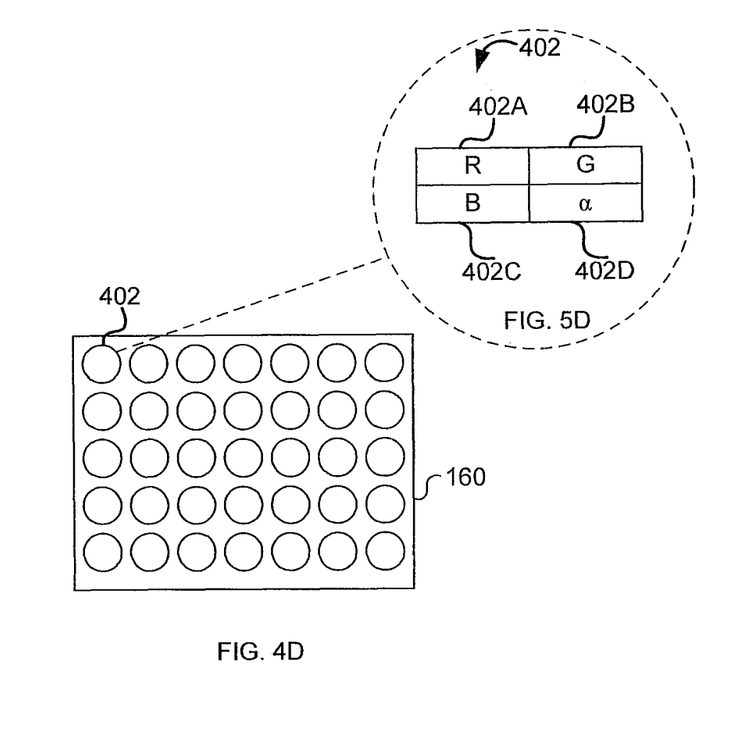
Figure 5A:
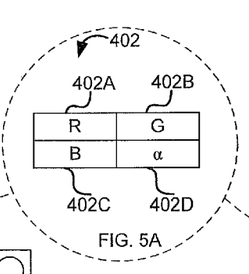
Figure 5B:
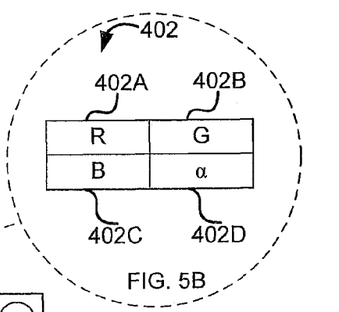

FIG. 3 illustrates a process 300 for decoding, from image file 160, map information used to define an array of map tiles forming a game map that is navigated during gameplay.

In an operation 302, image file 160 may be received. The image file may be received before, during, and/or after a gameplay. In an operation 304, the image file may be decoded. Image file decoding may be performed based on the type of image file format.

In an operation 306, numerical values that represent tile information may be obtained from the decoded image file. In an operation 308, the tile information may be determined based on obtained the numerical values. For example, an association between each numerical value and the tile information for which the numerical value represents may be stored and recalled locally. In an operation 310, at least a portion of game map 180 may be generated based on the determined tile information.

FIGS. 4A, 4B, 4C, and 4D illustrate examples of pixels of an image file 160. In each of FIGS. 4A, 4B, 4C, and 4D (also collectively referred to as "FIG. 4"), image file 160 may include a plurality of pixels (although only a single pixel 402 is referenced in FIG. 4 for convenience). The plurality of pixels may each occupy a particular position within image file 160. Ordinarily, the plurality of pixels may together form an image whose resolution may depend on the number of pixels present in image file 160.

FIGS. 5A, 5B, 5C, and 5D illustrate examples of numerical values 402A, 402B, 402C, and 402D accommodated by a particular pixel 402 of the image files respectively illustrated in FIGS. 4A, 4B, 4C, and 4D. As illustrated in FIGS. 5A, 5B, 5C, and 5D (also collectively referred to as "FIG. 5"), a particular pixel 402 may accommodate numerical values 402A, 402B, 402C, 402D, although fewer or more values maybe used as well. In some embodiments, numerical value 402A may ordinarily specify a red "R" numerical color value that specifies a level of red to be used by pixel 402. In some embodiments, numerical value 402B may ordinarily specify a green "G" numerical color value that specifies a level of green to be used by pixel 402. In some embodiments, numerical value 402C may ordinarily specify a blue "B" numerical color value that specifies a level of blue to be used by pixel 402. In some embodiments, numerical value 402D may ordinarily specify a numerical transparency value that specifies a level of transparency to be used by pixel 402. The numerical values 402A, 402B, 402C, and/or 402D may ordinarily be combined to form a color and transparency of pixel 402 using a combination of the base colors and transparency specified by the numerical values. Although red, blue, and green base colors are illustrated, other base colors such as the subtractive Cyan ("C"), Magenta ("M"), Yellow ("Y"), Black ("K") color system may be used as well so long as the image file format employs lossless compression.

Although not illustrated in the FIG. 5, in some embodiments, each pixel (e.g., pixel 402 and/or other pixels) may be stored within image file 160 in association with respective numerical values 402A, 402B, 402C, and 402D. In some embodiments, image file 160 may include an indexed table of numerical values that is used for all pixels of the image file. In these embodiments, each pixel of image file 160 may reference an index number that points to numerical values 402A, 402B, 402C, and 402D in the indexed table of numerical values.

FIGS. 6A, 6B, 6C, and 6D illustrate examples of map tiles 602 of a game map 180 that respectively correspond to the numerical values illustrated in FIGS. 5A, 5B, 5C, and 5D.

Figure 6A:
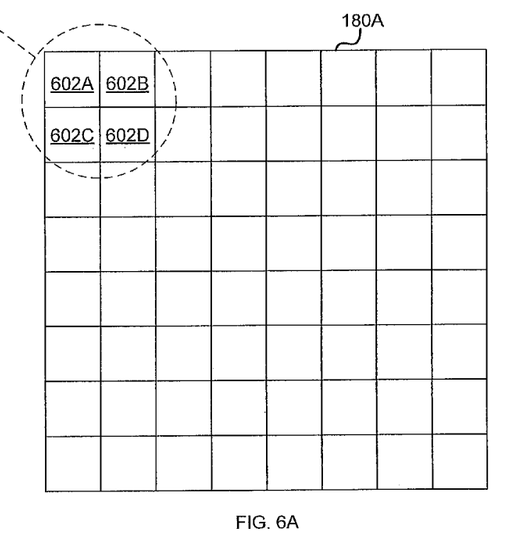
FIGS. 6A, 6B, 6C, and 6D illustrate examples of map tiles of a game map that respectively correspond to the numerical values illustrated in FIGS. 5A, 5B, 5C, and 5D.

FIG. 6A illustrates a game map 180A that includes four map tiles 602 (illustrated in FIG. 6A as map tile 602A, 602B, 602C, and 602D) for which tile information for each are encoded using a single pixel 402. As illustrated, map tiles 602 may be adjacent to one another. Although illustrated as being adjacent to one another is a "box format," the map tiles may 602 may be arranged in a linear or other arrangement with respect to one another so long as a position mapping is implicitly (e.g., always or by default a certain arrangement without an indication that specifies the arrangement) or explicitly (e.g., specified by an explicit indicator that specifies the arrangement) known by game server 120.

In some embodiments, each map tile 602 may be encoded using numerical values 402 that represent the tile information that describes each map tile. Numerical values 402A, 402B, 402C, and 402D may respectively represent tile information for map tiles 602A, 602B, 602C, and 602D.

For example, numerical value 402A, which ordinarily specifies a red color value, may be used to represent tile information for map tile 602A. Numerical value 402B, which ordinarily specifies a green color value, may be used to represent tile information for map tile 602B. Numerical value 402C, which ordinarily specifies a blue color value, may be used to represent tile information for map tile 602C. Numerical value 402D, which ordinarily specifies a red color value, may be used to represent tile information for map tile 602D.

In some embodiments, the particular orientation of map tiles 602 with respect to one another may be predefined such both the game server 120 and gameplay device 140 are configured to arrange the map tiles 602 as illustrated based on the position of pixel 402. A second pixel (not illustrated) after pixel 402 according to the image file format may similarly specify a corresponding next set of four map tiles (not illustrated) having an arrangement similar to map tiles 602.

Figure 6B:
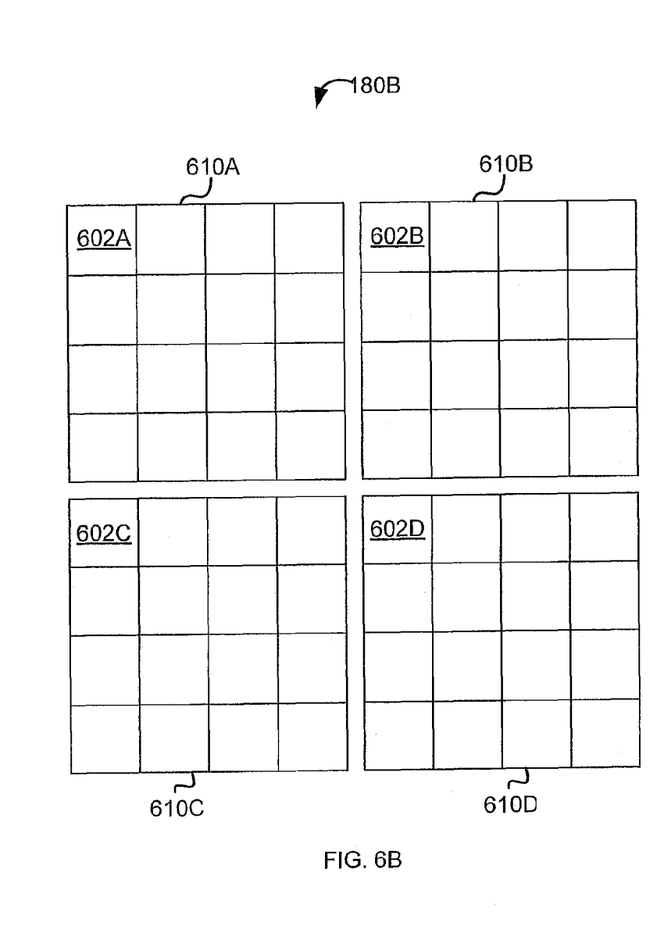

FIG. 6B illustrates a game map 180B that uses four quadrants 610A, 610B, 610C, and 610D. The various quadrants 610 are illustrated as being detached from one another for convenience. Game map 180B may be displayed in a manner illustrated by by FIG. 6A.

As illustrated, map tiles 602 may be positioned on different quadrants 610. Each map tile 602 may be encoded using numerical values 402 that represent the tile information that describes each map tile. Numerical values 402A, 402B, 402C, and 402D may respectively represent tile information for map tiles 602A, 602B, 602C, and 602D.

For example, numerical value 402A, which ordinarily specifies a red color value, may be used to represent tile information for map tile 602A. Numerical value 402B, which ordinarily specifies a green color value, may be used to represent tile information for map tile 602B. Numerical value 402C, which ordinarily specifies a blue color value, may be used to represent tile information for map tile 602C. Numerical value 402D, which ordinarily specifies a red color value, may be used to represent tile information for map tile 602D.

In some embodiments, the particular orientation of map tiles 602 with respect to different quadrants 610 may be predefined such both the game server 120 and gameplay device 140 are configured to arrange the map tiles 602 as illustrated based on the position of pixel 402. A second pixel (not illustrated) after pixel 402 according to the image file format may similarly specify a corresponding next set of four map tiles (not illustrated) having an arrangement similar to map tiles 602.

Figure 6C:
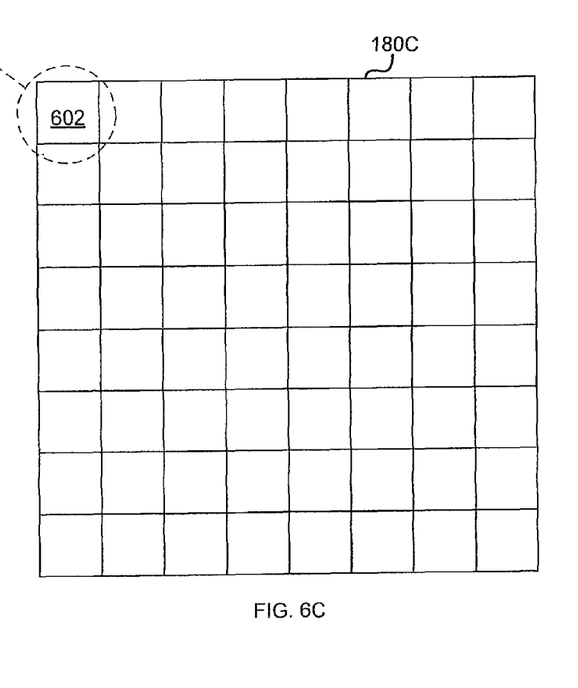

FIG. 6C illustrates a game map 180C that includes a single map tile 602 for which tile information is encoded using a single pixel 402. Different map tile characteristics of map tile 602 may be encoded using numerical values 402 that represent the tile information that describes each map tile. Thus, numerical values 402A, 402B, 402C, and 402D may respectively represent different map tile characteristics for map tile 602.

For example, numerical value 402A, which ordinarily specifies a red color value, may be used to represent a first map tile characteristic for map tile 602. Numerical value 402B, which ordinarily specifies a green color value, may be used to represent a second map tile characteristic for map tile 602. Numerical value 402C, which ordinarily specifies a blue color value, may be used to represent a third map tile characteristic for map tile 602. Numerical value 402D, which ordinarily specifies a blue color value, may be used to represent a fourth map tile characteristic for map tile 602.

In some embodiments, the particular orientation of map tiles 602 with respect to one another may be predefined such both the game server 120 and gameplay device 140 may be configured to arrange the map tiles 602 as illustrated based on the position of pixel 402. A second pixel (not illustrated) after pixel 402 according to the image file format may similarly specify a corresponding next map tile (not illustrated).

Figure 6D:
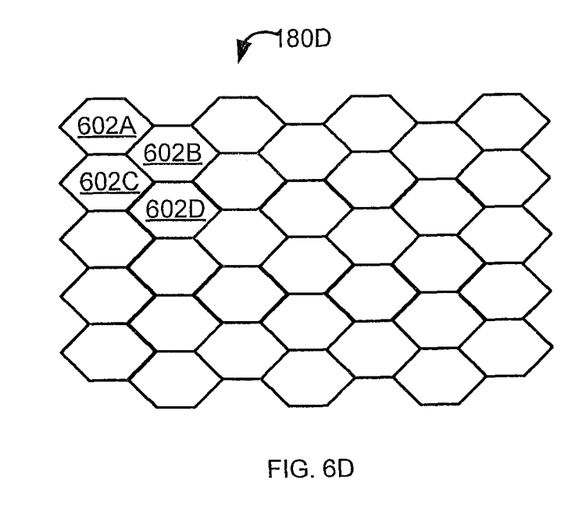

FIG. 6D illustrates a game map 180D that uses a hex map format and includes four map tiles 602 (illustrated in FIG. 6A as map tile 602A, 602B, 602C, and 602D) for which tile information for each are encoded using a single pixel 402. As illustrated, map tiles 602 may be adjacent to one another. Each map tile 602 may be encoded using numerical values 402 that represent the tile information that describes each map tile. Numerical values 402A, 402B, 402C, and 402D may respectively represent tile information for map tiles 602A, 602B, 602C, and 602D. The description of FIG. 6A is applicable to FIG. 6D as well, but instead using a hex map tiles.

For example, numerical value 402A, which ordinarily specifies a red color value, may be used to represent tile information for map tile 602A. Numerical value 402B, which ordinarily specifies a green color value, may be used to represent tile information for map tile 602B. Numerical value 402C, which ordinarily specifies a blue color value, may be used to represent tile information for map tile 602C. Numerical value 402D, which ordinarily specifies a red color value, may be used to represent tile information for map tile 602D.

In some embodiments, the particular orientation of map tiles 602 with respect to one another may be predefined such both the game server 120 and gameplay device 140 are configured to arrange the map tiles 602 as illustrated based on the position of pixel 402. A second pixel (not illustrated) after pixel 402 according to the image file format may similarly specify a corresponding next set of four map tiles (not illustrated) having an arrangement similar to map tiles 602.

In some embodiments, the hex map illustrated in FIG. 6D may be separated into quadrants or other groupings similar to the game map illustrated in FIG. 6B. As such, the description of FIG. 6B may be applicable to FIG. 6D, but instead using hex tiles.

In some embodiments, the hex map illustrated in FIG. 6D may be configured such that a map tile 602 is specified by values for base colors of a single pixel 402 similar to the game map illustrated in FIG. 6C. As such, the description of FIG. 6C may be applicable to FIG. 6D, but instead using hex tiles.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system configured to encode, in an image file, map information used to define an array of map tiles forming a game map that is navigated during gameplay, the system comprising:
   one or more physical processors configured to execute computer readable instructions; and
   memory storing computer readable instructions configured to cause the one or more physical processors to:
      obtain the map information, which specifies tile information for individual ones of the map tiles;
      represent the tile information for individual ones of the map tiles as numerical values;
      use an image format to encode the numerical values that represent the tile information for the individual tiles, wherein the image format accommodates a plurality of numerical values for individual pixels to specify levels for a plurality of base colors in a color space on a per pixel basis, and wherein the encoding includes recording the numerical values that represent the tile information for individual ones of the map tiles as the plurality of numerical values for the individual pixels such that the numerical values that would ordinarily correspond to an individual pixel correspond to the tile information;
      generate the image file comprising the encoded numerical values; and
      communicate the image file, wherein the image file is used to convey at least a portion of the game map.

2. The system of claim 1, wherein the plurality of numerical values for an individual pixel comprises a red color value, a green color value, a blue color value, and a transparency value that specifies a pixel of the image file.

3. The system of claim 2, wherein the red color value, the green color value, the blue color value, and the transparency value each comprise a range of values from 0 to 255.

4. The system of claim 2, wherein the numerical values comprise at least two distinct numerical values that specify different aspects of the game map, wherein the map information formatting module is further configured to:
   use the red color value, the green color value, the blue color value, or the transparency value to encode a first one of the at least two distinct numerical values; and
   use a different one of the red color value, the green color value, the blue color value, or the transparency value than used by the first one of the at least two distinct numerical values to encode a second one of the at least two distinct numerical values.

5. The system of claim 4, wherein each of the at least two distinct numerical values each specify a map tile that together with other map tiles forms the game map.

6. The system of claim 4, wherein the at least two distinct numerical values together specify a single map tile that together with other map tiles forms the game map.

7. The system of claim 4, wherein the different aspects of the game map one or more map tile characteristics comprising a tile level, a game environment, a level characteristic, an enemy camp, an enemy type, an enemy characteristic, a reward, an item find, or a special logic for tiles.

8. The system of claim 2, wherein the numerical values comprise a first numerical value, a second numerical value, a third numerical value, and a fourth numerical value that each specify different aspects of the game map, the map information formatting module further configured to:
   use the red color value to encode the first numerical value;
   use the green color value to encode the second numerical value;
   use the blue color value to encode the third numerical value; and
   use the transparent color value to encode the fourth numerical value.

9. The system of claim 8, wherein the first numerical value represents a first map tile, the second numerical value represents a second map tile, the third numerical value represents a third map tile, and the fourth numerical value represents a fourth map tile.

10. The system of claim 8, wherein the first map tile, the second map tile, the third map tile, and the fourth map tile are adjacent to one another on the game map.

11. The system of claim 8, wherein the first map tile, the second map tile, the third map tile, and the fourth map tile are each on different quadrants of the game map.

12. The system of claim 11, wherein the red color value is used to specify a first quadrant, the green color value is used to specify a second quadrant, the blue color value is used to specify a third quadrant, and the transparency value is used to specify the fourth quadrant.

13. A computer-implemented method of encoding, in an image file, map information used to specify a game map that is navigated during gameplay, the method being implemented in a computer that includes one or more processors configured to execute computer readable instructions and memory storing computer readable instructions that cause the one or more processors to perform the method, the method comprising:

obtaining, by the one or more processors, the map information, which specifies tile information for individual ones of the map tiles;

represent, by the one or more processors, the tile information for individual ones of the map tiles as numerical values;

encoding, by the one or more processors, the numerical values that represent the tile information for the individual tiles as an image format that accommodates a plurality of numerical values for individual pixels to specify levels for a plurality of base colors in a color space on a per pixel basis, and wherein the encoding includes recording the numerical values that represent the tile information for individual ones of the map tiles as the plurality of numerical values for the individual pixels such that the numerical values that would ordinarily correspond to an individual pixel correspond to the tile information;

generate, by the one or more processors, the image file comprising the encoded numerical values; and communicating, by the one or more processors, wherein the image file is used to convey at least a portion of the game map.

14. The method of claim 13, wherein the plurality of numerical values for an individual pixel comprises a red color value, a green color value, a blue color value, and a transparency value that specifies a pixel of the image file.

15. The method of claim 14, wherein the red color value, the green color value, the blue color value, and the transparency value each comprise a range of values from 0 to 255.

16. The method of claim 14, wherein the numerical values comprise at least two distinct numerical values that specify different aspects of the game map, the method further comprising:

using, by the map information formatting module, the red color value, the green color value, the blue color value, or the transparency value to encode a first one of the at least two distinct numerical values; and using, by the map information formatting module, a different one of the red color value, the green color value, the blue color value, or the transparency value than used by the first one of the at least two distinct numerical values to encode a second one of the at least two distinct numerical values.

17. The method of claim 16, wherein each of the at least two distinct numerical values each specify a map tile that together with other map tiles forms the game map.

18. The method of claim 16, wherein the at least two distinct numerical values together specify a single map tile that together with other map tiles forms the game map.

19. The method of claim 16, wherein the different aspects of the game map one or more map tile characteristics comprising a tile level, a game environment, a level characteristic, an enemy camp, an enemy type, an enemy characteristic, a reward, an item find, or a special logic for tiles.

20. The method of claim 14, wherein the numerical values comprise a first numerical value, a second numerical value, a third numerical value, and a fourth numerical value that each specify different aspects of the game map, the method further comprising:

using, by the map information formatting module, the red color value to encode the first numerical value;

using, by the map information formatting module, the green color value to encode the second numerical value;

using, by the map information formatting module, the blue color value to encode the third numerical value; and using, by the map information formatting module, the transparent color value to encode the fourth numerical value.

21. The method of claim 20, wherein the first numerical value represents a first map tile, the second numerical value represents a second map tile, the third numerical value represents a third map tile, and the fourth numerical value represents a fourth map tile.

22. The method of claim 20, wherein the first map tile, the second map tile, the third map tile, and the fourth map tile are adjacent to one another on the game map.

23. The method of claim 20, wherein the first map tile, the second map tile, the third map tile, and the fourth map tile are each on different quadrants of the game map.

24. The system of claim 23, wherein the red color value is used to specify a first quadrant, the green color value is used to specify a second quadrant, the blue color value is used to specify a third quadrant, and the transparency value is used to specify the fourth quadrant.

* * * * *